United States Patent [19]

Hodgson et al.

[11] Patent Number: 4,758,285
[45] Date of Patent: Jul. 19, 1988

[54] SHAPE-MEMORY ALLOY RESETTING METHOD

[75] Inventors: Darel E. Hodgson, Palo Alto; Robert B. Zider, Portola Valley, both of Calif.

[73] Assignee: CVI/Beta Ventures, Inc., Menlo Park, Calif.

[21] Appl. No.: 918,085

[22] Filed: Oct. 14, 1986

[51] Int. Cl.⁴ .............................................. C21D 8/00
[52] U.S. Cl. ........................ 148/11.5 R; 148/11.5 N; 148/131
[58] Field of Search ................. 148/402, 11.5 R, 131, 148/11.5 C, 11.5 N

[56] References Cited

U.S. PATENT DOCUMENTS

| | | | |
|---|---|---|---|
| 3,118,773 | 1/1964 | Bennett et al. | 99/182 |
| 3,180,636 | 4/1965 | Carpenter | 269/224 |
| 3,329,801 | 7/1967 | Shannon et al. | 219/388 |
| 3,540,718 | 11/1970 | Heffron et al. | 269/254 |
| 3,604,700 | 9/1971 | Gault | 269/288 |
| 4,054,376 | 10/1977 | Wareham | 351/178 |
| 4,249,889 | 2/1981 | Kemp | 432/11 |
| 4,283,233 | 8/1981 | Goldstein | 148/11.5 R |
| 4,314,790 | 2/1982 | Metz | 414/786 |
| 4,379,725 | 4/1983 | Kemp | 148/4 |
| 4,410,373 | 10/1983 | Kemp | 148/16 |
| 4,472,035 | 9/1984 | Takamura et al. | 351/41 |
| 4,484,955 | 11/1984 | Hochstein | 148/11.5 R |
| 4,493,737 | 1/1985 | Banker | 148/11.5 R |

FOREIGN PATENT DOCUMENTS

| | | | |
|---|---|---|---|
| 1104057 | 5/1986 | Japan | 148/402 |
| 1315652 | 5/1973 | United Kingdom | 148/11.5 N |

Primary Examiner—Christopher W. Brody
Attorney, Agent, or Firm—Burns, Doane, Swecker & Mathis

[57] ABSTRACT

The shape or configuration of an article made of shape-memory alloys, such as an eyeglass temple piece, or a hand held tool, is adjusted or readjusted to suit the wearer or user. While the shape-memory alloy of the article is in its martensitic state, the article may be readily deformed from its standard shape due to the alloy's low strength and malleability. The article is then confined or restrained in the customized shape so that upon heating the alloy does not return to its original austenitic or memory condition. Adequate heat is then supplied to the article to reform the austenitic state of the alloy in the desired customized shape. Preferably, the electrical resistance of the alloy is used to attain such internal heating to the resetting temperature of the article by current flow through the alloy.

7 Claims, 2 Drawing Sheets

SHAPE-MEMORY ALLOY RESETTING METHOD

FIELD OF THE INVENTION

The present invention relates to shape-memory alloys. More particularly it relates to a method of resetting the standard shape of articles, i.e., parts, formed of shape-memory alloys. The purpose for such resetting is to conform such articles to a custom shape of varying dimensions, shapes or configurations, such as for personal wear, depending upon the feel or desired appearance of the wearer. Such resetting is also used to adapt a tool for a desired function by a user without reworking the complete articles as by remolding, recasting or mechanical deformation.

It is a particular object of the invention to provide a rapid and simple method of adjusting the standard shape or configuration of different portions of an article, such as the lens frames or temple pieces of spectacles or other personal use or wear devices so that only selected portions of a standard or mass produced article need be adjusted or readjusted to conform to an individual wearer's or user's comfort and satisfaction. The method is particularly characterized by mechanically holding and preferably embedding within a fixable volume selected portions of a shape-memory alloy article in any newly customized shape of the article, as set in the martensitic state of the alloy (and at an ambient temperature of from slightly above to well below the normal temperature range at which the part is to be subsequently used) and then, heating only such selected portion of the article in the customized shape to a temperature substantially above the transformation temperature of the alloy to convert the crystalline structure of the shape-memory alloy to its austenitic state. The portion is then held or restrained in the customized shape during transformation of the alloy to prevent the portion from returning to the standard shape in the austenitic state during the time such portion is being reset.

BACKGROUND OF THE INVENTION

Shape-memory alloys have found a wide variety of uses in recent years. Such alloys have two primary states which are described in the prior art as the martensitic state and the austenitic state. In the martensitic state the alloy is weaker and malleable to a predeterminable extent. In the austenitic (or memory) state the alloy is stronger or more rigidly resilient. The alloy may be readily deformed under the martensitic state but then recovers from such deformation to its initial shape upon heating above the transformation temperature to recover such deformation to its austenitic state. The temperature condition under which such states occur is predeterminable in accordance with the alloy content of the metal. The two crystalline states of the alloy are above or below a transformation temperature lying within a critical temperature range. The transformation temperature is generally determined by the percentage of the constituent components (usually nickel and titanium) of the shape-memory alloy.

The alternate states of such alloy, the relatively sharp temperature transformations between these states, and the almost limitless ability of the alloy to reverse the states, have found many novel uses. It has been proposed heretofore to use shape-memory alloy in parts or devices wherein the alloy's relatively weaker malleable state absorbs displacement or deformation forces without permanent damage to the rest of the structure or device. After undergoing such deformation the article or structure may be restored to its original form or configuration by heating the part just above the transformation temperature. For example, eyeglass frames including temple and nose pieces, as disclosed in copending and commonly owned U.S. application Ser. No. 876,077, filed June 19, 1986, the disclosure of which is incorporated herein by reference, may be constructed using such shape-memory alloy as at least the reinforcing members for such frames. Such spectacles are not only more comfortable to wear, but also are immediately restorable to their original form merely by immersion in hot water, say 120° F., if dropped or inadvertently deformed during wear.

However, in prior known devices, the shape of the device in the austenitic state of the shape-memory alloy corresponds to a desired shape when the device is built and heretofore has required replacement or remanufacture to give the article a different shape in its austenitic state. The alloy is highly resistant to mechanical reshaping after it passes from the martensitic to the austenitic state. The method of the present invention is directed to reshaping articles, or portions of articles, quickly and easily without such mechanical reworking of the article to produce a new austenitic state. Accordingly, eyeglass frames or other personal wear items, such as shoes, orthodontic braces, partial dental plates or inner or outer clothing that require reinforcing elements such as bra underwires and corset stays may be readily conformed to the wearers individual anatomy or fashion at or near the point of use. The method is also particularly useful in shaping or reshaping hand-held tools, or other implements, such as surgical clamps, scalpels and the like to the user's desire or need.

DESCRIPTION OF THE PRIOR ART

It is known to heat plastic eyeglass frames including embedded metal rods to conform to a wearer's head configuration. This includes adjusting the length and tilt of the temple pieces and the frame nose pieces so that the spectacles rest comfortably and securely on the wearer's ears and nose. Since commercial eyeglass frames are normally made of metal or plastic in a few standard widths and lengths, it is necessary to fit each pair of glasses to the wearer. The glass frame is bent or twisted to configure it for the wearer's comfort. Where made of thermoplastic, the frame or temple pieces are normally immersed in a bed of heated glass beads, or particles. As disclosed in U.S. Pat. No. 4,054,376—WAREHAM, the frame may also be so heated by blowing hot air through the glass beads. The beads may be on the order of 10 to 30 mesh (approximately 0.065–0.02 inch diameter). In such an arrangement the beads are relatively loose so that the glass frame, including the temple pieces, can be submerged in the heated particles. Adjustment is then by hand manipulation after the heated frames are sufficiently soft to deform yieldably and before the frame cools to its newly set condition. A similar arrangement for adjusting optometric frames is disclosed in U.S. Pat. No. 3,329,801—SHANNON ET AL—wherein the spectacle frame is heated on an endless belt by hot air blowing over it. Both patents disclose the same arrangement for adjusting the frames.

It also has been proposed to form eyeglass frames of nickel-titanium directly or as a core beneath a sheath of nickel, chromium or copper as in U.S. Pat. No.

4,472,035—TAKAMAURA ET AL. However, no provision for conforming or fitting the frame is disclosed. Accordingly, the patentees do not teach or suggest conversion of such alloy from its martensitic state to the austenitic state of the frame so that the wearer can readily recover the like-new shape if during normal wear in the martensitic state the frame becomes deformed. This would be done by merely raising the temperature to the transformation point, say 120° F.

It has also been known to heat treat, or anneal, steel castings or the like in a bed of hot fluidized particles. The particles are heated by air or gas flowing over and around the article to be treated. Heat is carried and transferred from the particles, such as sand, to an article under treatment, so that it is either heated or held at a given temperature. The particles may be consolidated around the article by decreasing the gas flow and application of vacuum or vibration. U.S. Pat. No. 4,249,889—KEMP, discloses a system in which heated particles are levitated by air flow. The particles are then compacted around the article by vacuum. U.S. Pat. No. 4,410,373—KEMP, discloses a similar arrangement in which the particles are settled or compacted by vibration.

U.S. Pat. No. 4,314,790—METZ, discloses a similar system, using expanded vermiculite to hold the temperature of hot steel ingots or slabs, while they are being moved from one location to another. The particles are loosened by gas and then permitted to settle around the ingot or slab as insulation.

Additionally, it is also known to use fluidized particles for cooking food without water or pressure by positioning the article to be cooked, such as cans, within a bed of heated particles. Such a system is disclosed in U.S. Pat. No. 3,118,773—BENNETT ET AL.

It is also known to hold a workpiece while it is drilled or otherwise formed. For example, in U.S. Pat. No. 3604700—GAULT, a workpiece is held by a plurality of parallel rods confined within a circular or square jig. The rods are either squeezed radially or longitudinally by a plurality of balls that are locked by a screw, bolt or other compression means so that rods generally conform to an uneven surface to hold the piece while it is drilled, or otherwise worked on.

U.S. Pat. No. 3,180,636—CARPENTER, discloses a similar clamping arrangement to permit machining of a brittle article or the like. A rubber grommet around the workpiece squeezes the article radially in response to axial forces on the grommet.

U.S. Pat. No. 3,540,718—HEFFRON ET AL, discloses a jig for temporarily holding a plurality of circuit board components so that their connecting leads evenly protrude through printed circuit board holes. A sponge pad is cut into a plurality of contiguous, deflectable fingers which hold the components of different shapes and sizes against the board.

None of the above noted patents propose a method of confining a whole or a part of a shape-memory alloy object, such as lens frames, so that such parts, manufactured as standard or mass-produced articles, may be readily adjusted or readjusted to fit or suit the feel preference of an individual wearer. More importantly, none discloses that such a personally readjustable fit can be maintained by the wearer without frequent (and inconvenient) return to the optometrist's offices to have the frames refitted after inadvertently dropping or deforming them. By use of the present method, such fit is restored by simply raising the temperature above the transformation temperature for such shape-memory alloy to return to its austenitic state. In general such memory state may be readily restored by immersion in moderately hot water, say less than 120° F., as in daily normal use of hot water to clean the glasses or lenses. Furthermore, none discloses a method to conform any article requiring such custom adjustment so that it can be re-configured repeatedly in its martensitic state by constraining it in that configuration and then subjecting the shape-memory alloy to direct heat. Preferably such heat is electrically generated only in the part itself by using the relatively high resistance of such shape-memory alloy to raise the temperature of the article well above its transformation temperature, say up to approximately 300° C. or above, to reset the austenitic, or memory, state of the alloy to the customized configuration.

SUMMARY OF THE INVENTION

The present invention in one important aspect provides a method of setting or resetting a shape-memory alloy part having any standard shape while in its low-strength or deformable, martensitic state by deforming the part to a customized shape, then physically restraining the part. The restraining is preferably accomplished by a confining media defined as a fixable volume which is bound around at least the part of the article body so that it rigidly conforms to the selected shape. Adequate heat is then transmitted to the part to drive the temperature substantially above its transformation temperature so as to fix the new memory state of such portion to the same configuration as the customized shape.

Such heat may be applied by reactive current flow induced in the selected portion of the part; this may be by direct or alternating current flowing resistively through the part, or by alternating current flow by inductive or capacitive coupling to the part through the body of particles; in one form, microwave, or radio frequency, energy may be used to inductively heat the part without heating the clamping or embedding media, provided such media is substantially transparent (except around the article) to such electromagnetic energy. In a preferred form, advantage is taken of the electrical resistance of the alloy itself to generate such heat setting temperature internally. Heat may also be imparted to the article by conduction from the clamping or embedding media or by heated fluid which flows around the article and the clamping media.

In another aspect of the invention there is provided a method of forming a shape-memory alloy part into any customizable shape by forming the part having a standard shape into the customized shape with the alloy in its martensitic state, and then embedding the part in a body of particles which are placed under pressure or in a cold set or non-thermo set plaster or plastic, such as plaster of Paris (gypsum) or epoxy resin which conforms substantially uniformly to the desired surface features of the selected shape of said part and which immobilizes the part therein against recovery to its prior memory state until sufficient heat is applied to the alloy to reform its internal crystalline structure to the new form. It can be appreciated that a material such as a plaster physically restrains the part and further comprises a "fixable volume." Heat is then transferred to the part to drive its temperature substantially above its transformation temperature while the part is restrained from returning to its prior memory state. The part is now set to the customized shape and if subsequently reheated to the austenitic state while unrestrained will return to the customized shape.

Further objects and advantages of the present invention will become apparent from the description of the preferred embodiments taken with the drawings which form an integral part of this specification.

DESCRIPTION OF THE PREFERRED EMBODIMENTS

Figure 1:
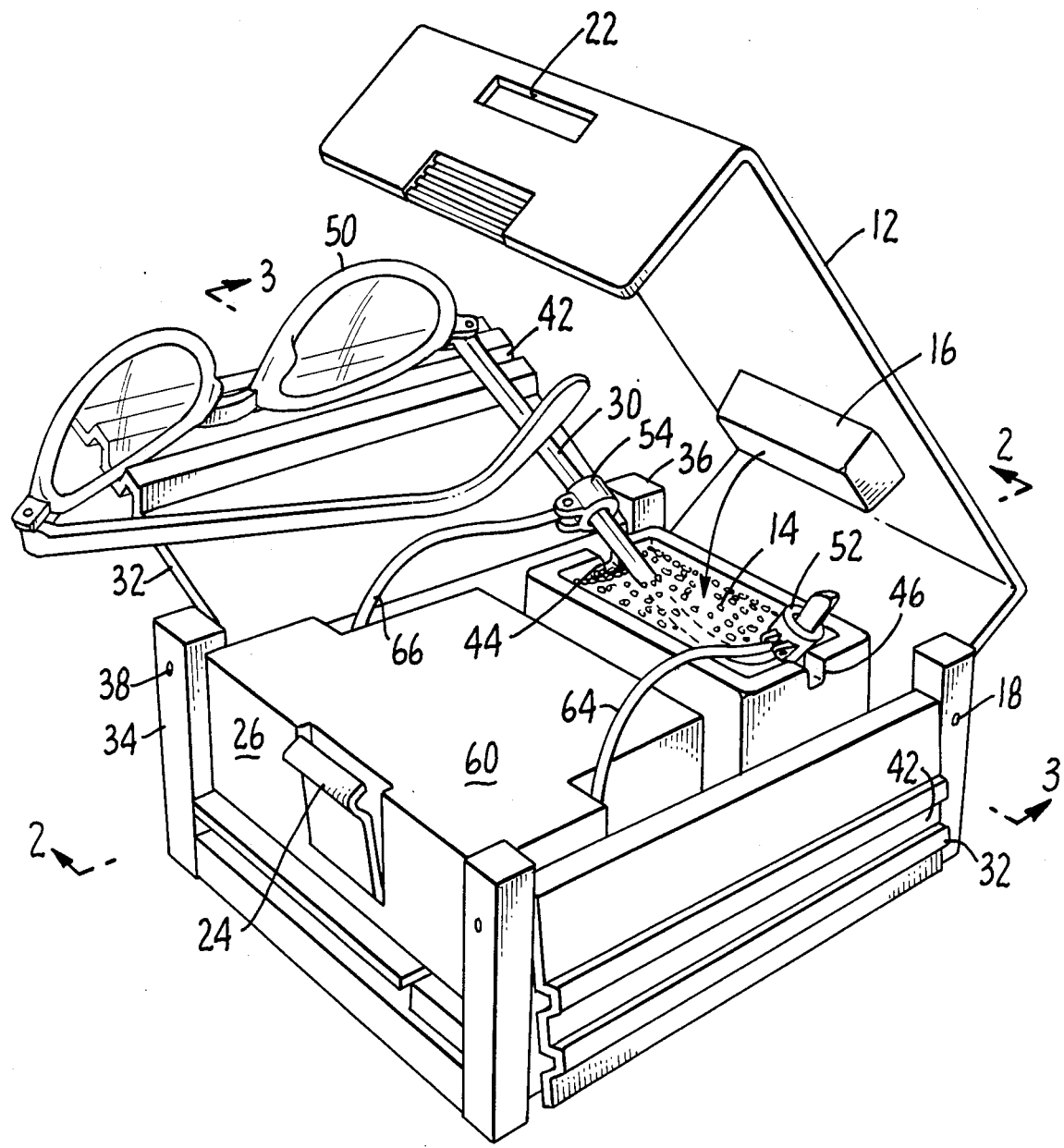
FIG. 1 is perspective view of one form of apparatus suitable for carrying out the method of the present invention in which method the shape-memory alloy portion of an article such as a portion of a temple piece of a pair of eyeglasses, a bra underwire or a hand-held surgical tool is to be set to a new "customized" memory shape. The portion of the temple piece is adapted to be embedded in a body of particles or powder comprising a "fixable volume" within a box having a molding compartment in which particles surrounding the portion are compressed by a piston member forming a part of the cover to "fix" the volume. The arrangement also illustrates a method of applying electrical current to the portion after it is customized to a given configuration of the portion as formed in its martensitic state while restraining the portion from returning to its previous memory shape until the temperature of the part is substantially above the transformation temperature to the austenitic state and applied for sufficient time to heat to permanently set the new memory state of the shape-memory alloy portion. It should be understood that the part may be fabricated into a "standard" shape as a mass produced article in a factory from a piece of shape-memory alloy while the alloy is in either its martensitic state or in its austenitic state. It is therefore possible that the article will not have a useful memory shape and thus the method of this invention may be called setting or resetting.

Referring now to the drawings and in particular FIG. 1, there is illustrated one form of apparatus suitable for carrying out the method of the present invention. It comprises generally box 10 forming an enclosing chamber for supporting a body of solid particles 14 in a trough member 11 adapted to receive and embed a shape-memory alloy article such as temple piece 30 of a pair of glasses 50. Particles 14 may be a fine-grained powder or sand, rock salt or glass beads of relatively small diameter, say from a few thousandths to a few tenths of an inch in diameter. Particles 14 surround and immobilize at least a reshaped portion of temple piece 30 when cover 12 of box 10 is closed and integral piston member 16 compacts bed of particles 14, fixing the volume, around pieces 30. Preferably the particle material has relatively low heat conductivity and in the present embodiment is preferably electrically non-conductive, so that the shape-memory alloy piece may be directly heated by any suitable electrical current, e.g. D.C. or A.C. from low to microwave frequencies, including sinusoidal or pulsed wave trains.

Various other forms of embedding devices may be used to physically restrain the newly customized shape after the standard shape is deformed while the alloy is in its martensitic state wherein the alloy has low strength so that it is relatively yieldable and malleable. In such state of the alloy, the device will remain deformed but will return to its original memory shape when heated to the austenitic state of the alloy unless the customized part is restrained along and around such part during the time heat is being increased to a temperature sufficient to reset the internal, crystalline structure of the shape-memory alloy element. Such setting temperature is substantially above the transformation range between the martensitic and austenitic conditions of the alloy, and may be on the order of 300° C.

Figure 2:
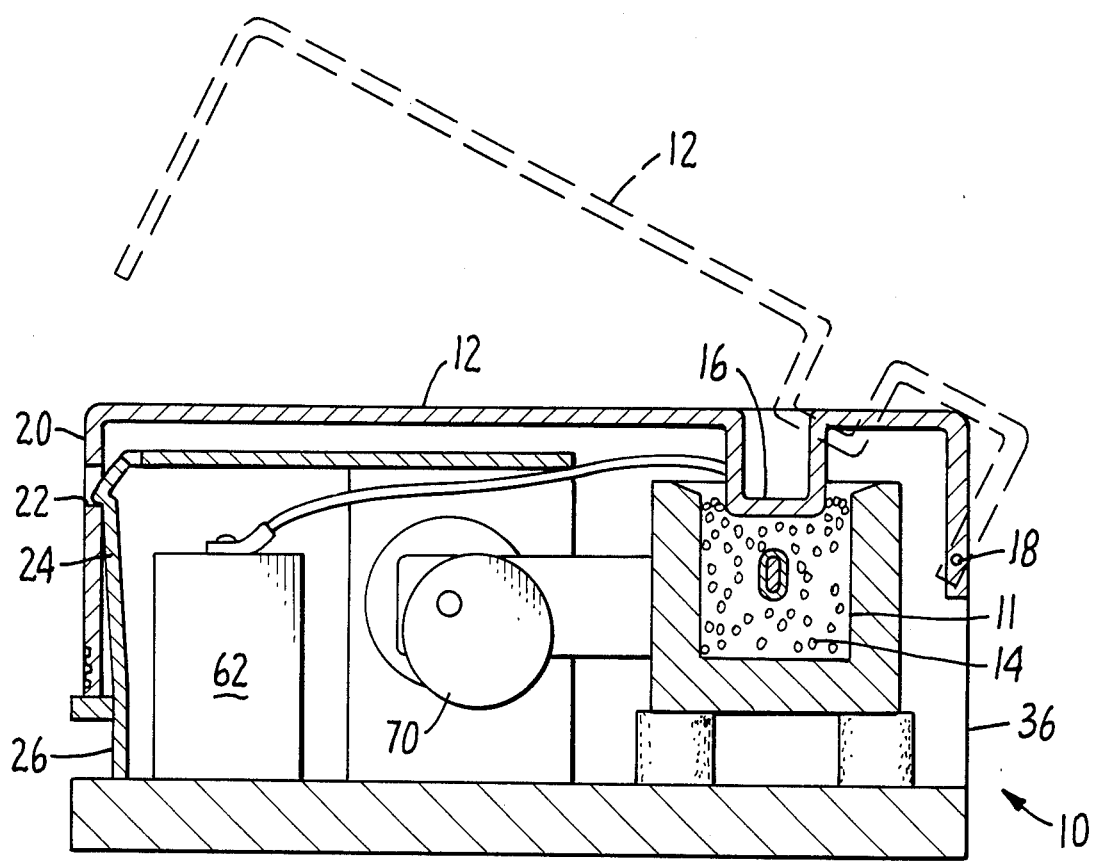
FIG. 2 is a elevation cross-sectional view taken in the direction of arrows 2—2 in FIG. 1 illustrating engagement and disengagement of the cover and the pressure applying means for immobilizing particles in the bed with a shape-memory alloy section embedded therein.
Figure 3:
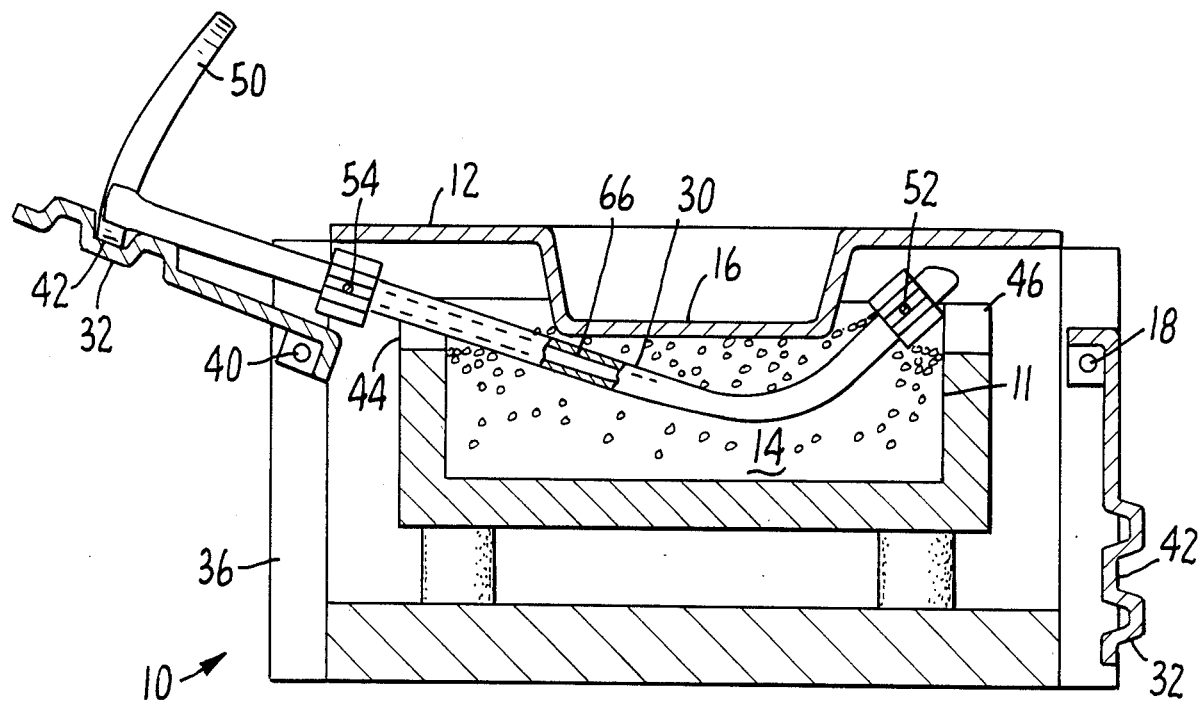
FIG. 3 is an elevation cross-sectional view taken in the direction of arrows 3—3 illustrating the temple piece, supported in the moldable bed of confining particles so as to hold the shape of the temple piece during transformation of the alloy from its set martensitic state to its memory or austenitic state.

With further reference to FIG. 1, cover 12 forms a safety enclosure both for the top of box 10 and for trough 14 through pressure foot, or piston member 16, secured to the inside of cover 12. Cover 12 pivots on hinge pins 18, so that plunger 16 applies pressure directly to the top of the bed of particles 14 in trough 11. This is best seen in FIGS. 2 and 3 wherein trough 11 is shown in crosssection both in front elevation, as in FIG. 3 and in end elevation as in FIG. 2. As also indicated, lid or cover 12 includes a front locking portion so that when piece 30 is being heated to above 300° C. there is no direct user access to the temple pieces or the particle bed. For this purpose slot 22 in lip 20 mates with catch member 24 carried by front wall 26 of box 10. The locked position of lid 12 holds pressure foot 16 so that it compacts particles 14 to mold around temple piece 30 of a pair of glasses 50 and thereby prevents the embedded portion of temple piece 30 from returning to its previous shape in the austenitic state and holds the temple piece immobilized during the time the crystalline structure of shape-memory alloy portion is being reconditioned to assume the desired memory shape.

As also shown in the arrangement of FIG. 1, eyeglass frame 50 may be supported by a side flap member 32 pivoted at the front and rear corners 34 and 36 of box 10 on pins 38 and 40 respectively. For convenience each side flap 32 includes molded track 42 to support glass frame 50 on either the left side or right side of box 10, as viewed facing front panel 26. In FIGS. 1–3 a left temple piece 30 is positioned by placing the eyeglass frame 50 in track 42 of left side flap 32 so that piece 30 extends into trough 11 at an angle such that it is embedded in the particles 14.

The temple piece is further accommodated by slots 44 and 46 in the edges of trough member 11 and tipped in such a position that the temple piece, especially the portion passing over an ear of wearer, is well within the particle bed but with the outer tips and hinge end of the temple piece exposed for engagement by electrical connectors 52 and 54. In the present embodiment the front portion 60 of box 10 may include a power source indicated generally as a battery 62 in FIG. 2. Desirably the source is capable of delivering low-voltage, high-current power through leads 64 and 66 to connectors 52 and 54 respectively.

Further in accordance with the method of the present invention, advantage is taken of the relatively high internal resistance of shape-memory alloys, and particularly those of Nitinol, an alloy of nickel and titanium. Nitinol has a high coefficient of resistance similar to nickel-chrome, as used in space heater elements. Thus, in relatively short periods of high current flow the temperature of the portion electrically coupled to the power source rises to over 300° C. and, thereby quickly sets the new crystalline structure of the shape-memory alloy in its new shape in the austenitic state.

In general, it is understood that the method of the instant invention is useful in setting and resetting any shape-memory alloy part and is not limited to Nitinol as numerous alloys are known which exhibit the shape-memory effect.

In the present embodiment the electrical connection to create such current flow is preferably made directly through the temple piece. Such connection may be made by pinpoint contacts adapted to extend through the plastic overcovering 66 on temple piece 30 to contact the shape-memory alloy, serving as a reinforcing member within the plastic temple piece 30. Alternatively, of course, the temple piece may be formed directly of a shape-memory alloy. In such case, the contact need only be sufficiently secure to transmit adequate current to raise the temperature of the temple piece in the section between electrodes 52 and 54 substantially above the transformation range in which the shape-memory alloy is transformed to its austenitic state from its martensitic state. The power from source 60 may be an alternating transformer secondary. Electrodes 52 and 54 may then be either capacitively or inductively connected to temple piece so that reactive current flows through the shape-memory alloy portion. Thus, current flow through temple piece 30 may be by any of the modes of reactive flow, namely resistance capacitance or inductance. The heat may also be generated within the shape-memory alloy part inductively by microwaves generated from an external source as by placing the box and primarily the bed of particles 14 with temple piece 30 embedded therein, in a microwave field, such as a common microwave oven. The sole requirement of such an installation is that the particles be substantially non-conductive and be transparent to such microwave electromagnetic radiation.

It is also envisioned that heat may be applied to the shape-memory alloy portion after it is clamped by flowing a hot fluid through the particles 14. This fluid might be hot oil or a hot gas, for example. It is additionally considered that the particles 14 themselves may be heated, such as in the case of their being made of a ferrite material subjected to an induction field and would then heat the shape-memory alloy portion by conduction. Other means for heating the area around said particles or heating the particles themselves are within the scope of the invention.

In the arrangement illustrated in FIG. 1-3, it will be apparent that side supports 32 and 42 will be raised into their frame support position (as illustrated on the left side of FIG. 1) so that in the elevated position, the opening through the side of the box is adequate to permit a temple piece, such as the left-hand temple piece, to extend into the bed particles 14 without interference.

For adjustment of the right temple piece the side support 42 may be raised and the right hand temple piece inserted from the right hand side of the box as viewed in FIG. 1.

If desired, a slight flow of air sufficiently low to prevent substantial displacement of particles 14 from trough 11 may be used to slightly levitate the particles. This permits the part to be removed from or embedded in the particles after the clamping force is removed. Additionally, such air flow may be used to cool the reset part more rapidly after heating. Further, while not shown, it will be apparent that bed of particles 14 may be sufficiently large to encompass any desired portion, or all of an article, to be reshaped to a new memory state, i.e., in setting other body support or shaped elements. Another method of assisting insertion or removal of the shape-memory alloy part is by vibration of particles 14 by an external vibrator 70, in the form of a solenoid, or as shown, by motor 72 driving eccentric weight 74. Vibrator 70 mechanically shakes particles 14 to aid in reducing the force required to insert the part into the bed to avoid further deformation of the part prior to application of heat by the electrodes. It will also be apparent that the electrodes may be within the body of particles if the part so requires.

From the foregoing it will be understood that any shape-memory alloy part that requires setting or re-setting after manufacture in a standard shape, to conform to a particular use, may be treated in the manner described in accordance with the method of the present invention and that adaptations in the embedding chamber and the particles as well as the pressure-applying means, may be made without departing from the scope of the present invention. For example, the part to be reshaped to a new austenitic state may be cast in a cold set mixture of plaster of Paris, or epoxy resin, and the like, until such cast hardens sufficiently to resist the internal restoration forces of the shape-memory alloy as the alloy passes from its martensitic state to its austenitic state and so holds the part until it reaches the new setting temperature. Obviously, mechanical restraints along and around the part whose memory shape in the austenitic state of the alloy is to be reset, such as clamps, or sleeves capable of resisting the internal restorative forces of the part in three dimensions may be used.

Other modifications and changes in the invention, both in the method and apparatus for carrying out such method, will become apparent to those skilled in the art from the foregoing description. All such modifications or changes coming within the scope of the appended claims are intended to be included therein.

We claim:

1. A method of resetting a shape-memory alloy part comprising the steps of:
   (a) providing a part formed of shape-memory alloy having a martensitic state and an austenitic state, the part being deformable to a customized configuration from an original configuration while the alloy is in the martensitic state and being unrecoverable from the customized configuration to the original configuration when heated to the austenitic state;
   (b) deforming at least a portion of said part from the original configuration to a customized configuration while said alloy is in its martensitic state;
   (c) physically confining said portion of the part while in the customized configuration within a body of unconsolidated solid particles to surround said portion;
   (d) compacting said particles around said portion to clamp said portion in the customized configuration and to restrain said portion from recovering to its original configuration; and
   (e) transmitting heat directly to said portion while said portion is confined within the body of particles to raise and hold the temperature of said portion to at least the austenitic setting temperature of the alloy resetting said portion to substantially the customized configuration, said portion being recoverable to the customized configuration when later heated to the austenitic state.

2. A method in accordance with claim 1 wherein said heat is electrically generated within said portion.

3. A method in accordance with claim 2 wherein said heat is induced by reactive current flow through said portion of said part by an alternating current field and at least said portion of said part is restrained within a bed of particles in said restraining volume with said particles being mechanically pressed around said portion.

4. A method in accordance with claim 3 wherein said reactive current flow is capacitatively coupled to said portion of said part through said particles by an alternating current field.

5. A method in accordance with claim 3 wherein said reactive current flow through said portion of said part is by resistive flow of said current through said portion of said part.

6. A method in accordance with claim 1 wherein said particles are substantially transparent to electromagnetic radiation and said portion is irradiated by microwaves.

7. A method in accordance with claim 3 wherein said reactive current is inductively coupled to said portion of said part.

* * * * *